(12) United States Patent
Lo et al.

(10) Patent No.: US 9,081,124 B2
(45) Date of Patent: Jul. 14, 2015

(54) BACKLIGHT MODULE

(71) Applicant: Shenzhen China Star Optoelectronics Technology Co., Ltd., Shenzhen, Guangdong (CN)

(72) Inventors: Changcheng Lo, Shenzhen (CN); Chong Huang, Shenzhen (CN); Weifeng Chen, Shenzhen (CN); Pangling Zhang, Shenzhen (CN); Chengling Lv, Shenzhen (CN); Yewen Wang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/003,018

(22) PCT Filed: Jul. 25, 2013

(86) PCT No.: PCT/CN2013/080140
§ 371 (c)(1),
(2) Date: Sep. 4, 2013

(87) PCT Pub. No.: WO2015/006998
PCT Pub. Date: Jan. 22, 2015

(65) Prior Publication Data
US 2015/0023059 A1 Jan. 22, 2015

(30) Foreign Application Priority Data
Jul. 16, 2013 (CN) .......................... 2013 1 0298068

(51) Int. Cl.
*F21V 8/00* (2006.01)
(52) U.S. Cl.
CPC ............ *G02B 6/0033* (2013.01); *G02B 6/0073* (2013.01)

(58) Field of Classification Search
USPC .......................... 362/632, 633, 634, 373, 294
See application file for complete search history.

(56) References Cited

U.S. PATENT DOCUMENTS

| | | | |
|---|---|---|---|
| 8,506,154 B2 * | 8/2013 | Lee et al. ....................... | 362/634 |
| 8,736,788 B2 * | 5/2014 | Kim et al. ...................... | 349/67 |
| 2006/0285362 A1 * | 12/2006 | Cho et al. ...................... | 362/633 |
| 2007/0041212 A1 * | 2/2007 | Cho et al. ...................... | 362/561 |
| 2007/0053205 A1 * | 3/2007 | Jang et al. ..................... | 362/609 |
| 2008/0170177 A1 * | 7/2008 | Chen ............................... | 349/64 |
| 2012/0162568 A1 * | 6/2012 | Sugawara ....................... | 349/58 |

FOREIGN PATENT DOCUMENTS

| | | |
|---|---|---|
| CN | 102777814 A | 11/2012 |
| KR | 1257900 B1 | 4/2013 |
| WO | WO2006133271 A1 | 6/2006 |

* cited by examiner

*Primary Examiner* — Laura Tso
(74) *Attorney, Agent, or Firm* — Andrew C. Cheng

(57) ABSTRACT

The present invention provides a backlight module, which includes: a backplane (2), a light guide plate (4) arranged in the backplane (2), a backlight source (6) mounted on the backplane (2), and a heat dissipation film (220) mounted on the backplane (2). The heat dissipation film (220) is made of graphene and has a thickness of 0.01-0.05 mm. The backlight module of the present invention provides includes a graphene-made heat dissipation film formed on a backplane to effectively improve the heat dissipation performance of the backlight module, allowing thermal energy to be uniformly distributed on the entire surface of the heat dissipation film in the plane direction to eliminate localized hot spots. Further, the graphene material is light-weighted so that addition of the heat dissipation film made of graphene does not significantly increase the weight of the backlight module.

18 Claims, 8 Drawing Sheets

BACKLIGHT MODULE

BACKGROUND OF THE INVENTION

1. Field of the Invention

The present invention relates to the field of liquid crystal displaying, and in particular to a backlight module having excellent heat dissipation performance.

2. The Related Arts

Liquid crystal displays have a variety of advantages, such as thin device body, low power consumption, and being free of radiation, and are thus of wide applications, such as mobile phone, personal digital assistant (PDA), digital camera, computer monitor, and notebook computer screen.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the operation principle is that a driving voltage is applied to the two glass substrates to control rotation direction of the liquid crystal molecules in order to refract out light emitting from the backlight module for generating images. Since the liquid crystal panel itself does not emit light, light must be provided from the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Referring to FIG. 1, the side-edge backlight module comprises a backplane 100, a reflector plate 200 arranged in the backplane 100, a light guide plate 300 arranged on the reflector plate 200, a backlight source 400 arranged in the backplane 100, and a heat dissipation sheet 500 arranged between the backlight source 400 and the backplane 100. The backplane 100 comprises a bottom board 102 and side boards 104 connected to the bottom board 102. The backlight source 400 is mounted on the heat dissipation sheet 500 via thermal grease (not shown). The heat dissipation sheet 500 is generally an aluminum board, a copper board, or a graphite patch, which is fixed by screws to the bottom board 102 of the backplane 100. Heat emitting from the backlight module 400 is transmitted through the heat dissipation sheet 500 to the bottom board 102 of the backplane 100 and is subjected to heat exchange with the surrounding air via the backplane 100. However, since thermal grease does not have excellent thermal conductivity, the performance of heat dissipation of the backlight module is poor, thus affecting the quality of the backlight module. Further, the heat dissipation sheet 500 made of an aluminum plate or a copper board is of a relatively great weight, which is disadvantageous for weight reduction of the backlight module.

SUMMARY OF THE INVENTION

An object of the present invention is to provide a backlight module that has a simple structure and betters the heat dissipation performance.

To achieve the above object, the present invention provides a backlight module, which comprises: a backplane, a light guide plate arranged in the backplane, a backlight source mounted on the backplane, and a heat dissipation film mounted on the backplane. The heat dissipation film is made of graphene and has a thickness of 0.01-0.05 mm.

The heat dissipation film is formed on the backplane by means of coating.

The backplane comprises a bottom board and a plurality of side boards perpendicularly connected to the bottom board. The backlight source is mounted to one of the side boards of the backplane.

The number of the heat dissipation film is two that are respectively formed on upper and lower surfaces of the bottom board. The dimension of the heat dissipation film in a lengthwise direction of the backlight source is greater than or equal to length of the backlight source and the dimension thereof in a direction normal to the lengthwise direction of the backlight source is 50-150 mm.

The number of the heat dissipation film is one that is formed on an upper surface or a lower surface of the bottom board. The dimension of the heat dissipation film in a lengthwise direction of the backlight source is greater than or equal to length of the backlight source and the dimension thereof in a direction normal to the lengthwise direction of the backlight source is 50-150 mm.

The heat dissipation film is of a single-layered or multi-layered structure.

The number of the heat dissipation film is one that is formed on a surface of the side board of the backlight source that is away from the backlight source. The dimension of the heat dissipation film in a lengthwise direction of the backlight source is greater than or equal to length of the backlight source and the dimension thereof in a direction normal to the lengthwise direction of the backlight source is equal to height of the side board to which the backlight source is mounted.

Further included are a reflection plate that is arranged between the bottom board and the light guide plate and an optical film assembly positioned on the light guide plate.

The backlight source comprises a linear LED light bar and the backplane comprises a heat dissipation sheet. The backlight source is mounted to the heat dissipation sheet.

The heat dissipation sheet is made of an aluminum sheet.

The present invention further provides a backlight module, which comprises: a backplane, a light guide plate arranged in the backplane, a backlight source mounted on the backplane, and a heat dissipation film mounted on the backplane, the heat dissipation film being made of graphene and having a thickness of 0.01-0.05 mm;

wherein the heat dissipation film is formed on the backplane by means of coating;

wherein the backplane comprises a bottom board and a plurality of side boards perpendicularly connected to the bottom board, the backlight source being mounted to one of the side boards of the backplane;

wherein the heat dissipation film is of a single-layered or multi-layered structure;

wherein the backlight source comprises a linear LED light bar and the backplane comprises a heat dissipation sheet, the backlight source being mounted to the heat dissipation sheet; and wherein the heat dissipation sheet is made of an aluminum sheet.

The number of the heat dissipation film is two that are respectively formed on upper and lower surfaces of the bottom board. The dimension of the heat dissipation film in a lengthwise direction of the backlight source is greater than or equal to length of the backlight source and the dimension thereof in a direction normal to the lengthwise direction of the backlight source is 50-150 mm.

The number of the heat dissipation film is one that is formed on an upper surface or a lower surface of the bottom board. The dimension of the heat dissipation film in a lengthwise direction of the backlight source is greater than or equal to length of the backlight source and the dimension thereof in a direction normal to the lengthwise direction of the backlight source is 50-150 mm.

The number of the heat dissipation film is one that is formed on a surface of the side board of the backlight source that is away from the backlight source. The dimension of the heat dissipation film in a lengthwise direction of the backlight source is greater than or equal to length of the backlight source and the dimension thereof in a direction normal to the lengthwise direction of the backlight source is equal to height of the side board to which the backlight source is mounted.

Further included are a reflection plate arranged between the bottom board and the light guide plate and an optical film assembly positioned on the light guide plate.

The efficacy of the present invention is that the present invention provides a backlight module that comprises a graphene-made heat dissipation film formed on a backplane to effectively improve the heat dissipation performance of the backlight module, allowing thermal energy to be uniformly distributed on the entire surface of the heat dissipation film in the plane direction to eliminate localized hot spots. Further, the graphene material is light-weighted so that addition of the heat dissipation film made of graphene does not significantly increase the weight of the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
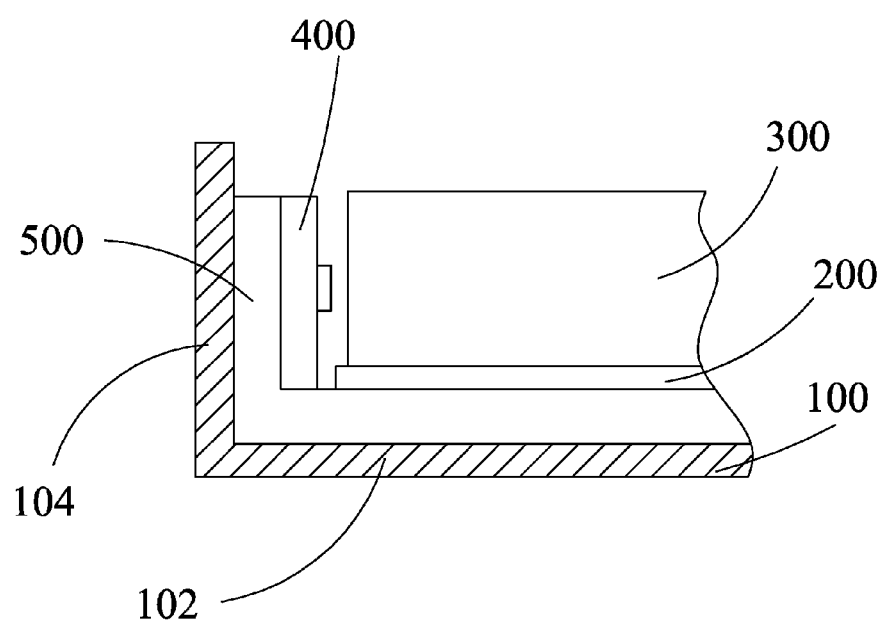
FIG. 1 is a schematic view showing the structure of a conventional backlight module.
Figure 2:
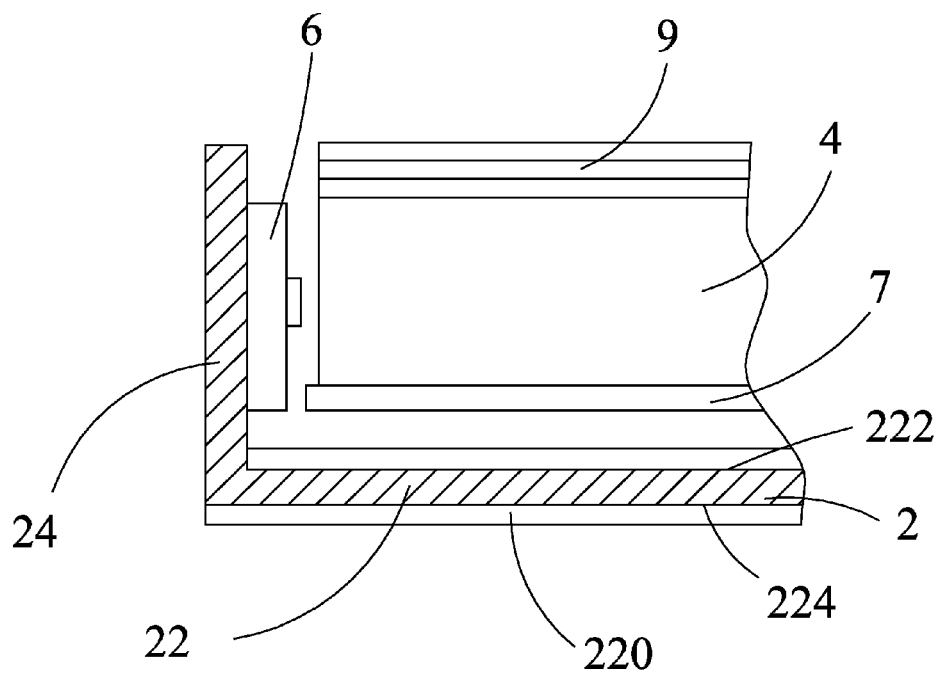
FIGS. 2 is a schematic view showing the structure of a backlight module according to a first preferred embodiment of the present invention.

Referring to FIG. 2, which is a schematic view showing the structure of a backlight module according to a first preferred embodiment of the present invention, the present invention provides a backlight module, which comprises: a backplane 2, a light guide plate 4 arranged on the backplane 2, a backlight source 6 mounted in the backplane 2, and a heat dissipation film 220 mounted on the backplane 2. The heat dissipation film 220 is made of graphene, which can be of a single-layered or multi-layered structure. The heat dissipation film 220 is formed on the backplane 2 by means of coating.

Graphene is a novel material that has various advantages, including temperature resistance, low thermal expansion coefficient, excellent thermal and electrical conductivity, and low frictional coefficient, and can be attached to a curved surface or an irregular surface. Graphene has a relatively high horizontal thermal conductivity (in plane direction) for heat dissipation and is capable of fast transferring energy in the plane direction so as to result in uniform heat distribution on the entire surface in the plane direction and eliminate localized hot spots. A single layer of graphene has a thermal conductivity coefficient that is as high as 4000-6600 W/m·K, higher than those of graphite sheet, carbon nanotube, and diamond, and us considered one of the currently discovered materials that has the best heat dissipation performance. Further, the density of graphene is relatively smaller than those of metallic materials. Thus, substituting metallic materials with graphene can effectively reduce the weight of the thermal conductive material used to provide the same performance of heat dissipation. Reference is made to the following table, which is a table listing the thermal conductivity coefficients of the commonly used thermal conductive materials.

| | materials | thermal conductivity (W/m·K) |
|---|---|---|
| commonly-used metals | silver | 429 |
| | copper | 401 |
| | gold | 317 |
| | aluminum | 237 |
| carbon material | GTS (thermally conductive graphite sheet) | 1500-1700 |
| | CNT (carbon nanotube) | 3000-3500 |
| | diamond | 1000-2200 |
| | graphene | 4000-6600 |
| others | silica gel | 1-3 |

Figure 3:
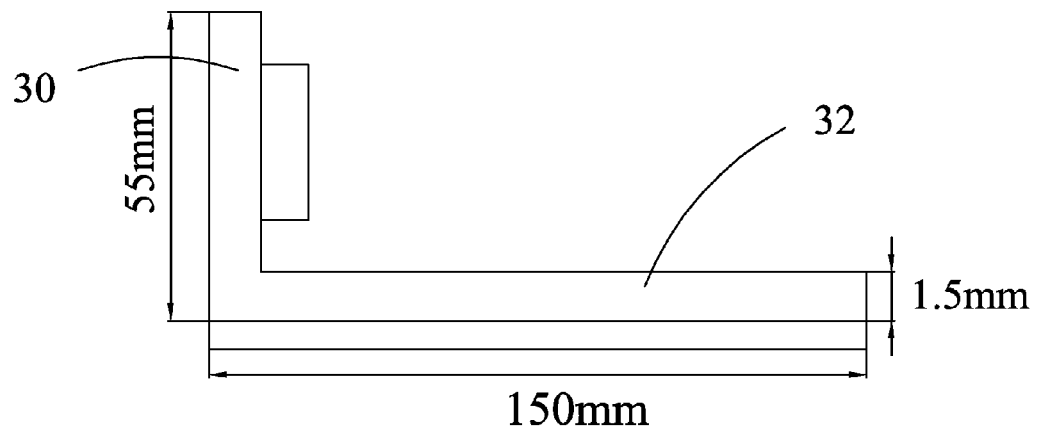
FIG. 3 is a simulation model for studying the relationship between thickness of graphene and heat dissipation performance.

The thickness of the heat dissipation film 220 can be determined through analysis with simulation experiments and a simulation model shown in FIG. 3 is built by being composed of an LED light, a graphene layer, and a heat dissipation board, wherein the heat dissipation board is an "L" shaped material of an aluminum alloy of which the mode number is: 6063. The heat dissipation board comprises a vertical section 30 and a horizontal section 32. The LED light is mounted on the vertical section 30. The graphene layer is coated on an undersurface of the horizontal section of the heat dissipation board. The vertical section 30 has a height of 55 mm and the horizontal section 32 has a length of 150 mm. The thickness of the heat dissipation board is 1.5 mm. Under the condition that power density is 0.08 W/mm, graphene radiation=0.95, and the width of the graphene layer is 150 mm, the thickness of the graphene layer is varied and the maximum temperature of the simulation model corresponding to each thickness is calculated to make a plot to thereby obtain FIG. 4.

It is note that due to the factors of lattice defects of graphene product and thickness stacking, the actual K value may not reach the ideal value of being greater than 4000 w/m·k. Further, also due to thickness stacking, K value in z-direction is believed to also be affected. Thus, the K value of the simulation model is taken as the following value for feasibility analysis:

In x- and y-direction (the plane direction), K=3000 W/m·K and in z-direction (the thickness direction), K=35 W/m·K.

Figure 4:
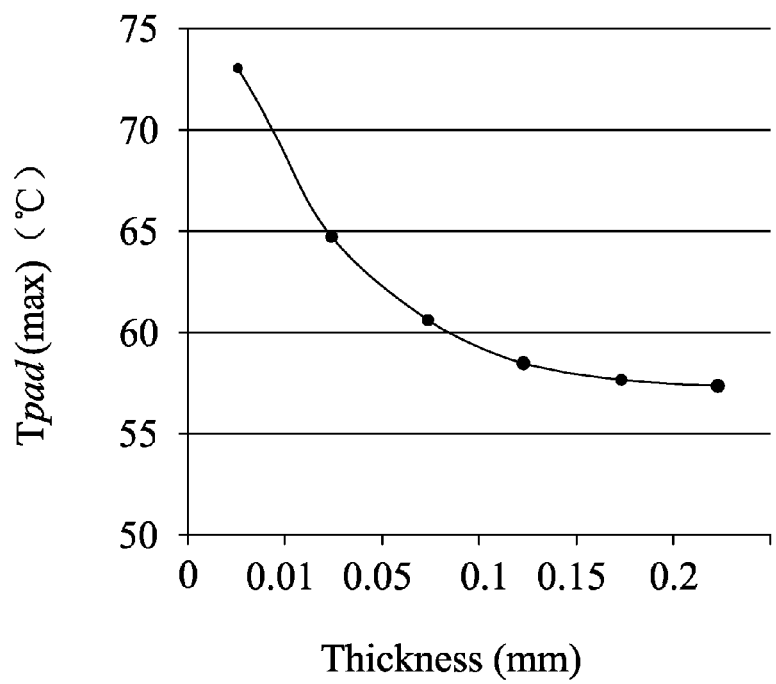
FIG. 4 is a plot showing the relationship between the thickness of graphene and the maximum temperature of the simulation model illustrated in FIG. 3 under the condition of identical width (150 mm)

Referring to FIG. 4, which is a plot showing an empirically obtained relationship between thickness of graphene and the simulation model shown in FIG. 3 under the condition of identical width (150 mm). The plot reveals that when the coating thickness exceeds 0.1 mm, the drop of temperature gets slow. Thus, a preferred thickness is 0.01-0.05 mm.

Thus, in the instant embodiment, the thickness of the heat dissipation film 220 is set to be 0.01-0.05 mm.

The backplane 2 comprises a bottom board 22 and a plurality of side boards 24 perpendicularly connected to the bottom board 22. The backlight source 6 is mounted to one of the side boards 24 of the backplane 2 to make a side-edge backlight module.

In the instant embodiment, the number of the heat dissipation film 220 used is two that are respectively formed on upper and lower surfaces 222, 224 of the bottom board 22. The dimension of the heat dissipation film 220 measured in the lengthwise direction of the backlight source 6 is greater than or equal to the length of the backlight source 6 and the dimension thereof in a direction normal to the lengthwise direction of the backlight source 6 is 50-150 mm. Preferably, the dimension of the heat dissipation film 220 is the lengthwise direction of the backlight source 6 is equal to the dimension of the bottom board 22 in that direction, namely the heat dissipation film 220 is completely coated on the bottom board 22 in that direction.

It will be explained with reference to the simulation model that the arrangement of the heat dissipation film according to the instant embodiment of the present invention gives improved technical effectiveness.

Figure 5:
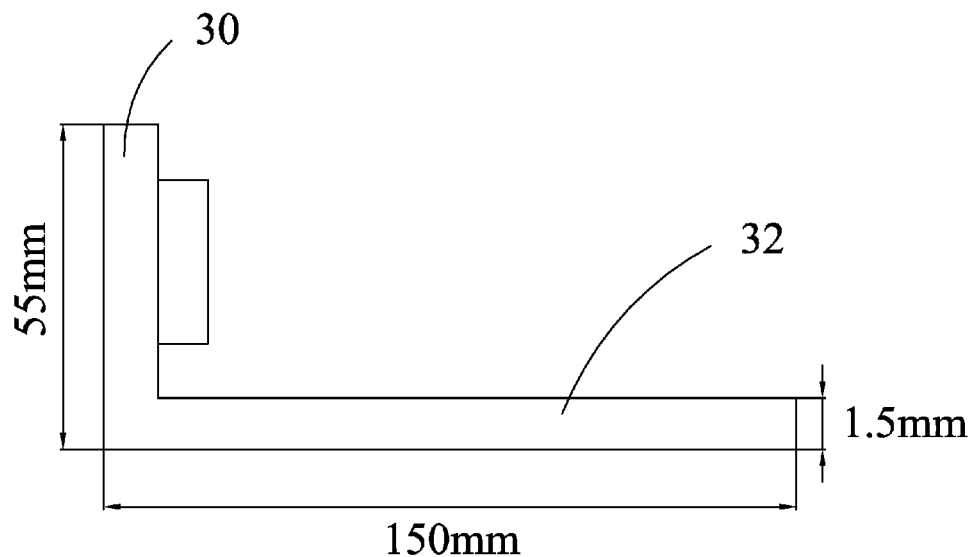
FIG. 5 is a schematic view showing the structure of a simulation model of an LED light and a heat dissipation board.

Referring to FIG. 5, a simulation model of an LED light and a heat dissipation board is built, wherein the heat dissipation board is an "L" shaped material of an aluminum alloy of which the mode number is: 6063. The heat dissipation board comprises a vertical section 30 and a horizontal section 32. The LED light is mounted on the vertical section 30. The vertical section 30 has a height of 55 mm and the horizontal section 32 has a length of 150 mm. The thickness of the heat dissipation board is 1.5 mm. Under the condition that power density is 0.08 W/mm, the maximum temperature Tpad(max) of the simulation model is 73.3° C. (ambient temperature: 25° C.).

Figure 6:
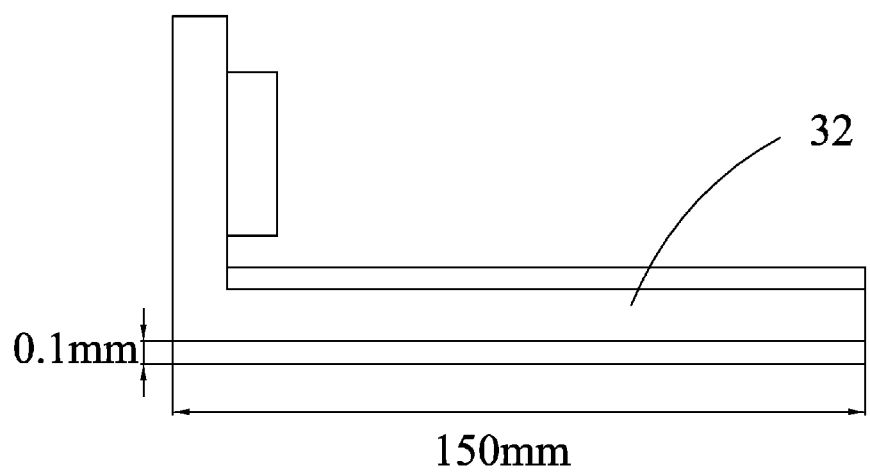
FIG. 6 is a schematic view showing the structure of a simulation model of a heat dissipation board coated with graphene and an LED light corresponding to the first preferred embodiment of the present invention.

Referring to FIG. 6, a graphene layer having a thickness of 0.1 mm and a width of 150 mm is coated on each of two surfaces of the horizontal section 32 of the heat dissipation board shown in FIG. 5. Under the condition that ambient temperature: 25° C., power density=0.08 W/mm, graphene radiation=0.95, and the K values of the graphene are selected to be: K=3000 W/m·K in x- and y-direction (the plane direction) and K=35 W/m·K in z-direction (the thickness direction), simulation calculation gives that the maximum temperature Tpad(max) of the simulation model is 50.5° C. Compared to the simulation model of FIG. 5 that is not coated with the graphene layer, the maximum temperature is lowered down by 22.8° C. Apparently, the heat dissipation performance of the backlight module according to the instant embodiment is superior to the heat dissipation performance of the conventional backlight module.

It is noted that in the instant embodiment, the backlight module further comprises a reflection plate 7 arranged between the bottom board 22 and the light guide plate 4 and an optical film assembly 9 positioned on the light guide plate 4. The backlight source 6 comprises a linear LED light bar.

Figure 7:
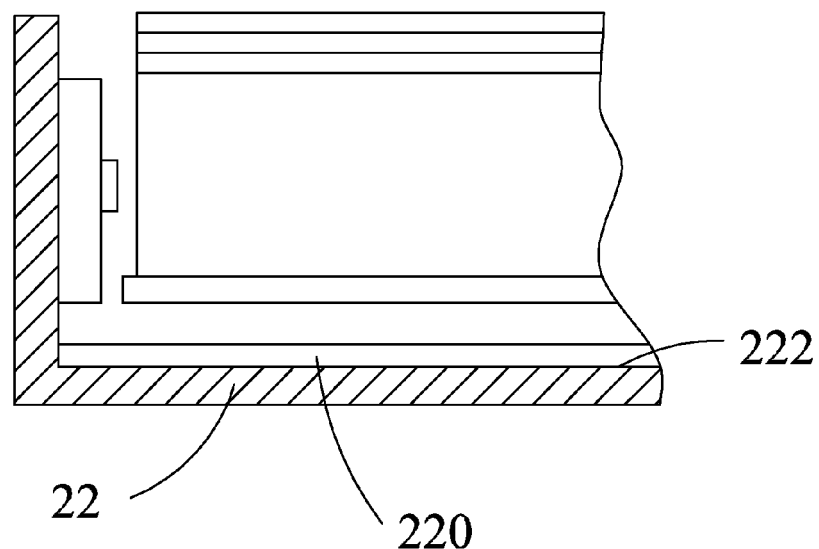
FIG. 7 is a schematic view showing the structure of a backlight module according to a second preferred embodiment of the present invention.

Referring to FIG. 7, which is a schematic view showing the structure of a backlight module according to a second preferred embodiment of the present invention, in the instant embodiment, the number of the heat dissipation film 220 used is one that is formed on an upper surface 222 of the bottom board 22.

In the instant embodiment, the heat dissipation film 220 has a thickness of 0.01-0.05 mm. The dimension of the heat dissipation film 220 in the lengthwise direction of the backlight source 6 is greater than or equal to the length of the backlight source 6 and the dimension thereof in a direction normal to the lengthwise direction of the backlight source 6 is 50-150 mm. Preferably, the dimension of the heat dissipation film 220 is the lengthwise direction of the backlight source 6 is equal to the dimension of the bottom board 22 in that direction, namely the heat dissipation film 220 is completely coated on the bottom board 22 in that direction.

It will be again explained with reference to a simulation model that the arrangement of the heat dissipation film according to the instant embodiment of the present invention gives improved technical effectiveness.

Figure 8:
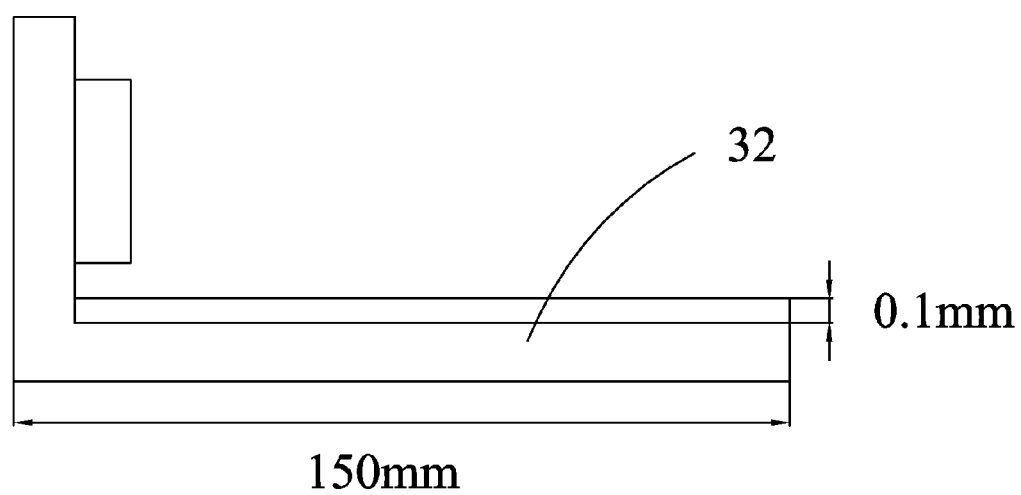
FIG. 8 is a schematic view showing the structure of a simulation model of a heat dissipation board coated with graphene and an LED light corresponding to the second preferred embodiment of the present invention.

Referring to FIG. 8, which illustrates simulation calculation corresponding to the second preferred embodiment of the present invention, a graphene layer having a thickness of 0.1 mm and a width of 150 mm is coated on an upper surface of the horizontal section 32 of the heat dissipation board shown in FIG. 5. Under the condition that ambient temperature: 25° C., power density=0.08 W/mm, graphene radiation=0.95, and the K values of the graphene are selected to be: K=3000 W/m·K in x- and y-direction (the plane direction) and K=35 W/m·K in z-direction (the thickness direction), simulation calculation gives that the maximum temperature Tpad(max) of the simulation model is 58.3° C. Compared to the simulation model of FIG. 5 that is not coated with the graphene layer, the maximum temperature is lowered down by 15.0° C. Apparently, the heat dissipation performance of the backlight module according to the instant embodiment is similarly superior to the heat dissipation performance of the conventional backlight module.

Figure 9:
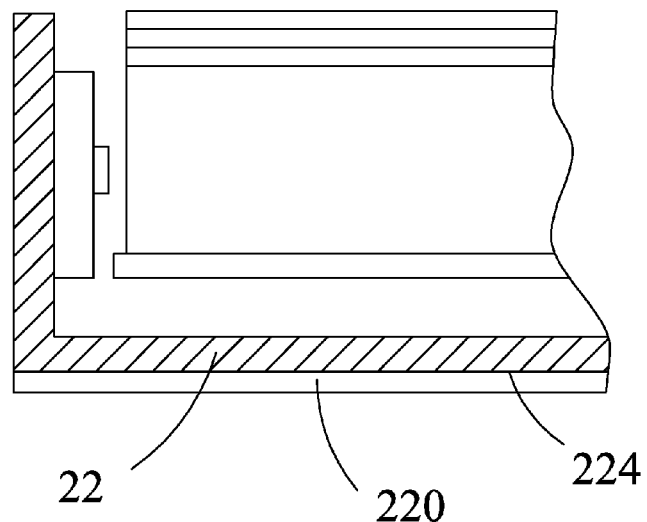
FIG. 9 is a schematic view showing the structure of a backlight module according to a third preferred embodiment of the present invention.

Referring to FIG. 9, which is a schematic view showing the structure of a backlight module according to a third preferred embodiment of the present invention, in the instant embodiment, the number of the heat dissipation film 220 used is one that is formed on a lower surface 224 of the bottom board 22.

In the instant embodiment, the heat dissipation film 220 has a thickness of 0.01-0.05 mm. The dimension of the heat dissipation film 220 in the lengthwise direction of the backlight source 6 is greater than or equal to the length of the backlight source 6 and the dimension thereof in a direction normal to the lengthwise direction of the backlight source 6 is 50-150 mm. Preferably, the dimension of the heat dissipation film 220 is the lengthwise direction of the backlight source 6 is equal to the dimension of the bottom board 22 in that direction, namely the heat dissipation film 220 is completely coated on the bottom board 22 in that direction.

It will be again explained with reference to a simulation model that the arrangement of the heat dissipation film according to the instant embodiment of the present invention gives improved technical effectiveness.

Figure 10:
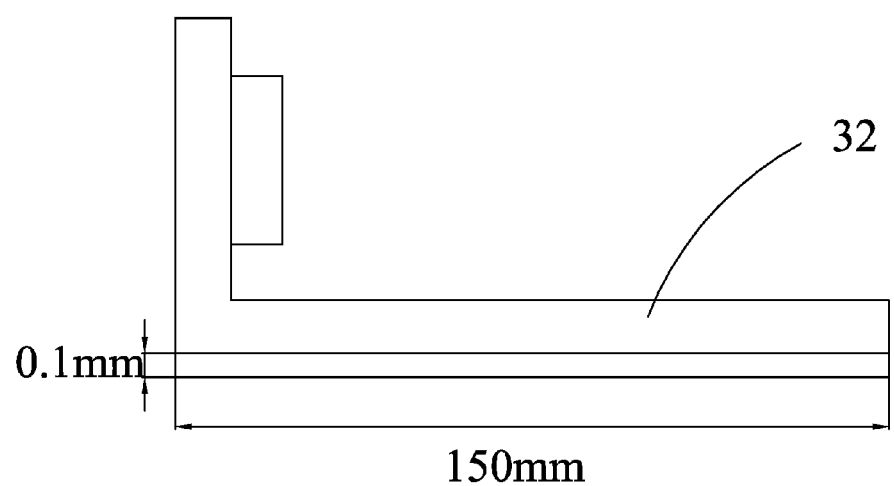
FIG. 10 is a schematic view showing the structure of a simulation model of a heat dissipation board coated with graphene and an LED light corresponding to the third preferred embodiment of the present invention.

Referring to FIG. 10, which illustrates simulation calculation corresponding to the third preferred embodiment of the present invention, a graphene layer having a thickness of 0.1 mm and a width of 150 mm is coated on an upper surface of the horizontal section 32 of the heat dissipation board shown in FIG. 5. Under the condition that ambient temperature: 25° C., power density=0.08 W/mm, graphene radiation=0.95, and the K values of the graphene are selected to be: K=3000 W/m·K in x- and y-direction (the plane direction) and K=35 W/m·K in z-direction (the thickness direction), simulation calculation gives that the maximum temperature Tpad(max) of the simulation model is 58.3° C. Compared to the simulation model of FIG. 5 that is not coated with the graphene layer, the maximum temperature is lowered down by 15.0° C. Apparently, the heat dissipation performance of the backlight module according to the instant embodiment is similarly superior to the heat dissipation performance of the conventional backlight module.

Figure 11:
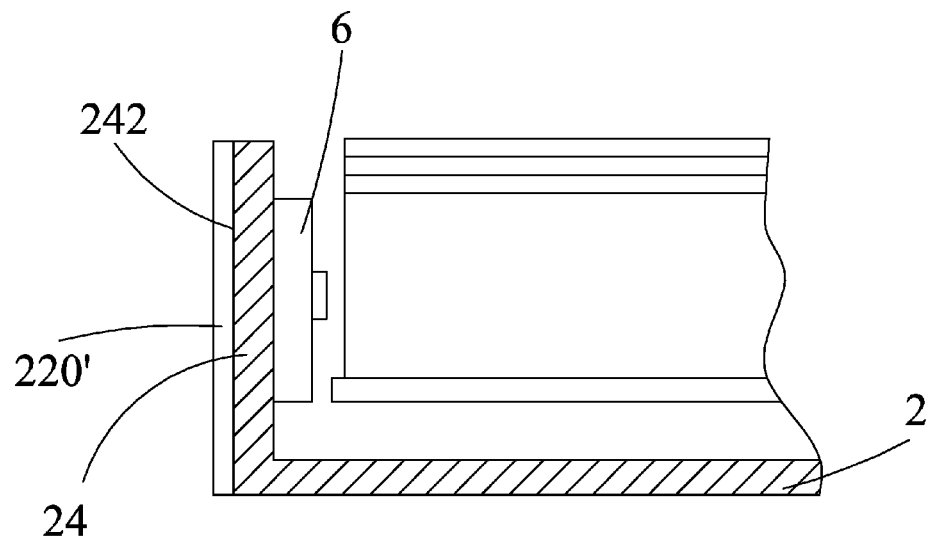
FIG. 11 is a schematic view showing the structure of a backlight module according to a fourth preferred embodiment of the present invention.

Referring to FIG. 11, which is a schematic view showing the structure of a backlight module according to a fourth preferred embodiment of the present invention, in the instant embodiment, the number of the heat dissipation film 220' used is one that is formed on a surface 242 of the side board 24 that is away from the backlight source 6. The heat dissipation film 220' has a thickness of 0.01-0.05 mm. The dimension of the heat dissipation film 220 in the lengthwise direction of the backlight source 6 is greater than or equal to the length of the backlight source 6 and the dimension thereof in a direction normal to the lengthwise direction of the backlight source 6 is equal to the height of the side board 24 to which the backlight source 6 is mounted. Preferably, the dimension of the heat dissipation film 220 is the lengthwise direction of the backlight source 6 is equal to the width of the side board 24 in that direction, namely the heat dissipation film 220 is completely coated on the side board 23 in that direction.

Figure 12:
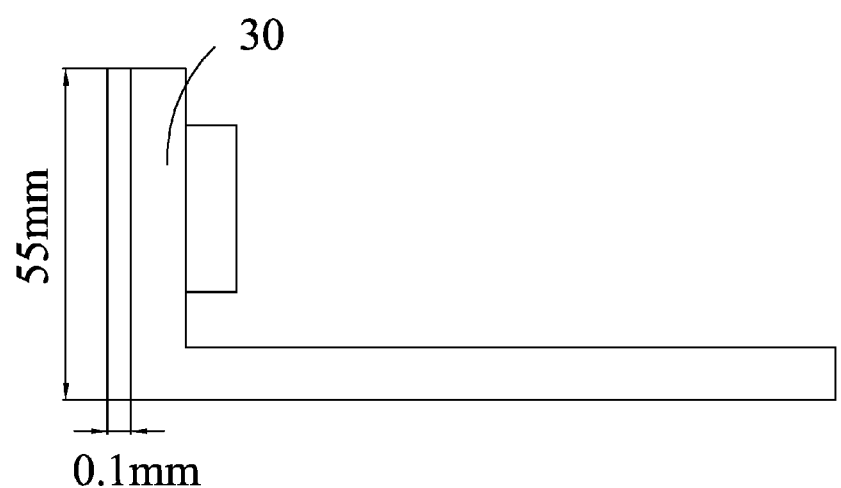
FIG. 12 is a schematic view showing the structure of a simulation model of a heat dissipation board coated with graphene and an LED light corresponding to the fourth preferred embodiment of the present invention.

Referring to FIG. 12, which illustrates simulation calculation corresponding to the third preferred embodiment of the present invention, a graphene layer having a thickness of 0.1 mm and a width of 55 mm is coated on an outer surface of the vertical section 30 of the heat dissipation board shown in FIG. 5. Under the condition that ambient temperature: 25° C., power density=0.08 W/mm, graphene radiation=0.95, and the K values of the graphene are selected to be: K=3000 W/m·K in x- and y-direction (the plane direction) and K=35 W/m·K in z-direction (the thickness direction), simulation calculation gives that the maximum temperature Tpad(max) of the simulation model is 70.8° C. Compared to the simulation model of FIG. 5 that is not coated with the graphene layer, the maximum temperature is lowered down by 2.5° C. Apparently, the heat dissipation performance of the backlight module according to the instant embodiment is similarly superior to the heat dissipation performance of the conventional backlight module.

Figure 13:
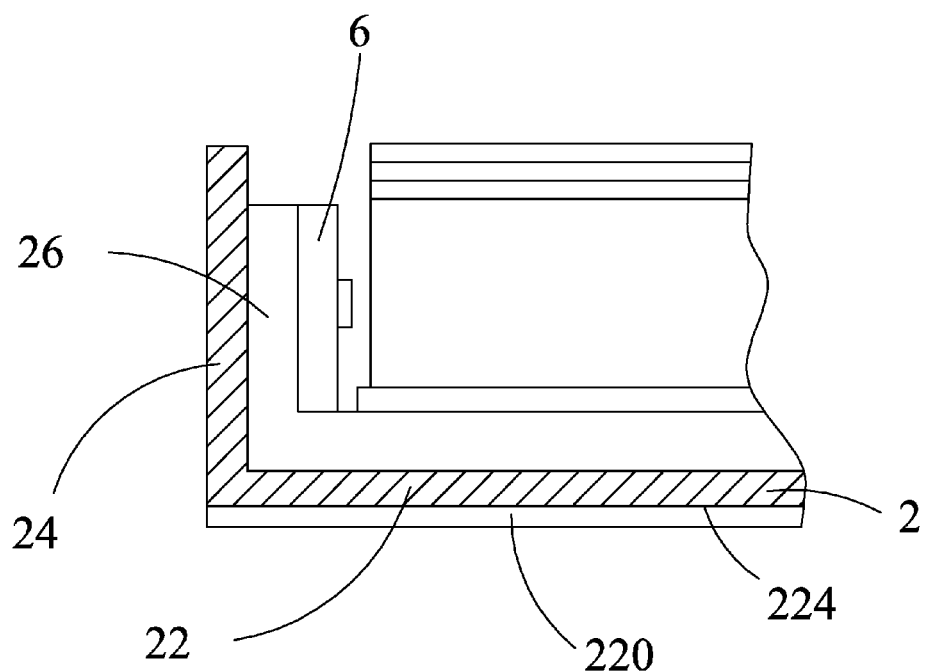
FIG. 13 is a schematic view showing the structure of a backlight module according to a fifth preferred embodiment of the present invention.

Referring to FIG. 13, which is a schematic view showing the structure of a backlight module according to a fifth preferred embodiment of the present invention, in the instant embodiment, the number of the heat dissipation film 220 used is one that is formed on a lower surface 224 of the bottom board 22. The heat dissipation film 220 has a thickness of 0.01-0.05 mm. The dimension of the heat dissipation film 220 in the lengthwise direction of the backlight source 6 is greater than or equal to the length of the backlight source 6 and the dimension thereof in a direction normal to the lengthwise direction of the backlight source 6 is 50-150 mm. Preferably, the dimension of the heat dissipation film 220 is the lengthwise direction of the backlight source 6 is equal to the dimension of the bottom board 22 in that direction, namely the heat dissipation film 220 is completely coated on the bottom board 22 in that direction. Further, the backlight module further comprises a heat dissipation sheet 26 mounted on the backplane 2 and the backlight source 6 is mounted on the heat dissipation sheet 26. The heat dissipation sheet 26 is made of an aluminum sheet.

With the structure of the backlight module according to the fifth preferred embodiment of the present invention being used as a backlight module of a 55-inch liquid crystal display, temperatures are empirically measured. When no such a heat dissipation film is included, the maximum temperature measured is 71.2° C. and with such a heat dissipation film (thickness being 0.05 mm and width 100 mm) included, the measured maximum temperature is 64.2° C. Thus, in a practical application, the temperature of the backlight module is effectively lowered and the quality of the backlight module can thus be improved.

In summary, the present invention provides a backlight module that comprises a graphene-made heat dissipation film formed on a backplane to effectively improve the heat dissipation performance of the backlight module, allowing thermal energy to be uniformly distributed on the entire surface of the heat dissipation film in the plane direction to eliminate localized hot spots. Further, the graphene material is light-weighted so that addition of the heat dissipation film made of graphene does not significantly increase the weight of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source mounted on the backplane, and a heat dissipation film mounted on the backplane, the heat dissipation film being made of graphene and having a thickness of 0.01-0.05 mm;
wherein the backplane comprises a bottom board and a plurality of side boards perpendicularly connected to the bottom board the backlight source being mounted to one of the side boards of the backplane.

2. The backlight module as claimed in claim 1, wherein the heat dissipation film is formed on the backplane by means of coating.

3. The backlight module as claimed in claim 1, wherein the heat dissipation film comprises two portions that are respectively formed on upper and lower surfaces of the bottom board, the dimension of each of the portions of the heat dissipation film in a lengthwise direction of the backlight source being greater than or equal to length of the backlight source and the dimension thereof in a direction normal to the lengthwise direction of the backlight source being 50-150 mm.

4. The backlight module as claimed in claim 1, wherein the heat dissipation film is formed on an upper surface or a lower surface of the bottom board, the dimension of the heat dissipation film in a lengthwise direction of the backlight source being greater than or equal to length of the backlight source and the dimension thereof in a direction normal to the lengthwise direction of the backlight source being 50-150 mm.

5. The backlight module as claimed in claim 1, wherein the heat dissipation film is formed on a surface of the side board of the backlight source that is away from the backlight source, the dimension of the heat dissipation film in a lengthwise direction of the backlight source being greater than or equal to length of the backlight source and the dimension thereof in a direction normal to the lengthwise direction of the backlight source being equal to height of the side board to which the backlight source is mounted.

6. The backlight module as claimed in claim 1 further comprising a reflection plate arranged between the bottom board and the light guide plate and an optical film assembly positioned on the light guide plate.

7. The backlight module as claimed in claim 1, wherein the backlight source comprises a linear LED light bar and the backplane comprises a heat dissipation sheet, the backlight source being mounted to the heat dissipation sheet.

8. The backlight module as claimed in claim 7, wherein the heat dissipation sheet is made of an aluminum sheet.

9. A backlight module, comprising: a backplane, a light guide plate arranged in the backplane, a backlight source mounted on the backplane, and a heat dissipation film mounted on the backplane, the heat dissipation film being made of graphene and having a thickness of 0.01-0.05 mm;
wherein the heat dissipation film is formed on the backplane by means of coating;
wherein the backplane comprises a bottom board and a plurality of side boards perpendicularly connected to the bottom board, the backlight source being mounted to one of the side boards of the backplane;
wherein the backlight source comprises a linear LED light bar and the backplane comprises a heat dissipation sheet, the backlight source being mounted to the heat dissipation sheet; and
wherein the heat dissipation sheet is made of an aluminum sheet.

10. The backlight module as claimed in claim 9, wherein the heat dissipation film comprises two portions that are respectively formed on upper and lower surfaces of the bottom board, the dimension of the heat dissipation film in a lengthwise direction of the backlight source being greater than or equal to length of the backlight source and the dimension thereof in a direction normal to the lengthwise direction of the backlight source being 50-150 mm.

11. The backlight module as claimed in claim 9, wherein the heat dissipation film is formed on an upper surface or a lower surface of the bottom board, the dimension of the heat dissipation film in a lengthwise direction of the backlight source being greater than or equal to length of the backlight source and the dimension thereof in a direction normal to the lengthwise direction of the backlight source being 50-150 mm.

12. The backlight module as claimed in claim 9, wherein the heat dissipation film is formed on a surface of the side board of the backlight source that is away from the backlight source, the dimension of the heat dissipation film in a lengthwise direction of the backlight source being greater than or equal to length of the backlight source and the dimension thereof in a direction normal to the lengthwise direction of the backlight source being equal to height of the side board to which the backlight source is mounted.

13. The backlight module as claimed in claim 9 further comprising a reflection plate arranged between the bottom board and the light guide plate and an optical film assembly positioned on the light guide plate.

14. A backlight module, comprising: a backplane, a light guide plate arranged in the backplane, a backlight source mounted on the backplane, and a heat dissipation film mounted on the backplane, the heat dissipation film being made of graphene and having a thickness of 0.01-0.05 mm, wherein the backlight source comprises a linear LED light bar and the backplane comprises a heat dissipation sheet, the backlight source being mounted to the heat dissipation sheet.

15. The backlight module as claimed in claim 14, wherein the heat dissipation sheet is made of an aluminum sheet.

16. The backlight module as claimed in claim 14, wherein the heat dissipation film comprises two portions that are respectively formed on upper and lower surfaces of the bottom board, the dimension of each of the portions of the heat dissipation film in a lengthwise direction of the backlight source being greater than or equal to length of the backlight source and the dimension thereof in a direction normal to the lengthwise direction of the backlight source being 50-150 mm.

17. The backlight module as claimed in claim 14, wherein the heat dissipation film is formed on an upper surface or a lower surface of the bottom board, the dimension of the heat dissipation film in a lengthwise direction of the backlight source being greater than or equal to length of the backlight source and the dimension thereof in a direction normal to the lengthwise direction of the backlight source being 50-150 mm.

18. The backlight module as claimed in claim 14, wherein the heat dissipation film is formed on a surface of the side board of the backlight source that is away from the backlight source, the dimension of the heat dissipation film in a lengthwise direction of the backlight source being greater than or equal to length of the backlight source and the dimension thereof in a direction normal to the lengthwise direction of the backlight source being equal to height of the side board to which the backlight source is mounted.

* * * * *